US 6,732,682 B2

(12) United States Patent
Aoyama et al.

(10) Patent No.: US 6,732,682 B2
(45) Date of Patent: May 11, 2004

(54) CONTROL SYSTEM AND METHOD FOR AN INTERNAL COMBUSTION ENGINE

(75) Inventors: Shunichi Aoyama, Kanagawa (JP); Katsuya Moteki, Tokyo (JP); Kenshi Ushijima, Kanagawa (JP); Ryosuke Hiyoshi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 102 days.

(21) Appl. No.: 10/079,588

(22) Filed: Feb. 22, 2002

(65) Prior Publication Data

US 2002/0139346 A1 Oct. 3, 2002

(30) Foreign Application Priority Data

Mar. 27, 2001 (JP) .......................... 2001-089326

(51) Int. Cl.⁷ .................... F02D 13/00; F02D 15/02; F02P 5/145
(52) U.S. Cl. ................ 123/48 B; 123/406.55; 123/78 BA; 60/285
(58) Field of Search .............. 123/48 B, 406.55, 123/78 BA; 60/285

(56) References Cited

U.S. PATENT DOCUMENTS

| 4,979,427 A | * | 12/1990 | Pfeffer et al. ............. 123/48 B |
| 5,535,586 A | * | 7/1996 | Ohta et al. .................... 60/285 |
| 6,212,879 B1 | * | 4/2001 | Nishimura et al. ........... 60/285 |
| 6,394,051 B1 | * | 5/2002 | Filipe et al. .................. 60/285 |

FOREIGN PATENT DOCUMENTS

| JP | 11-107725 | 4/1999 |
| JP | 11-324625 | 11/1999 |
| JP | 2000-73804 | 3/2000 |

* cited by examiner

Primary Examiner—Erick Solis
(74) Attorney, Agent, or Firm—Foley & Lardner LLP

(57) ABSTRACT

A control system for an internal combustion engine is provided. The engine includes a compression ratio control mechanism and an ignition timing control system. The control system comprises an engine control for controlling the compression ratio control mechanism and the ignition timing control system so that when the engine is cold, the ignition timing is retarded largely from an MBT point and the compression ratio is set higher than that obtained when the engine is cold and operated at corresponding engine rpm and engine load. A method for controlling such an internal combustion engine is also provided.

23 Claims, 12 Drawing Sheets

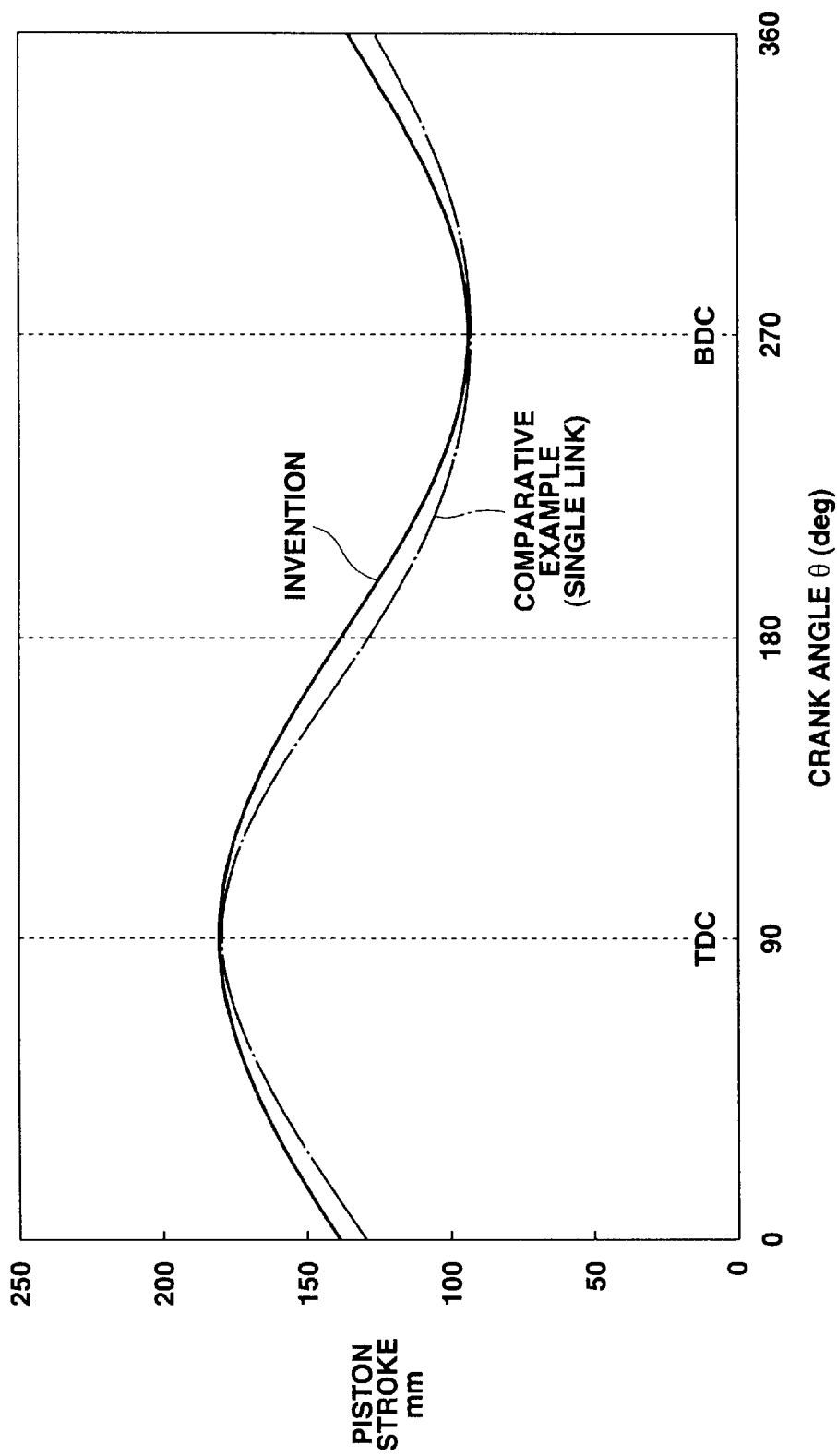

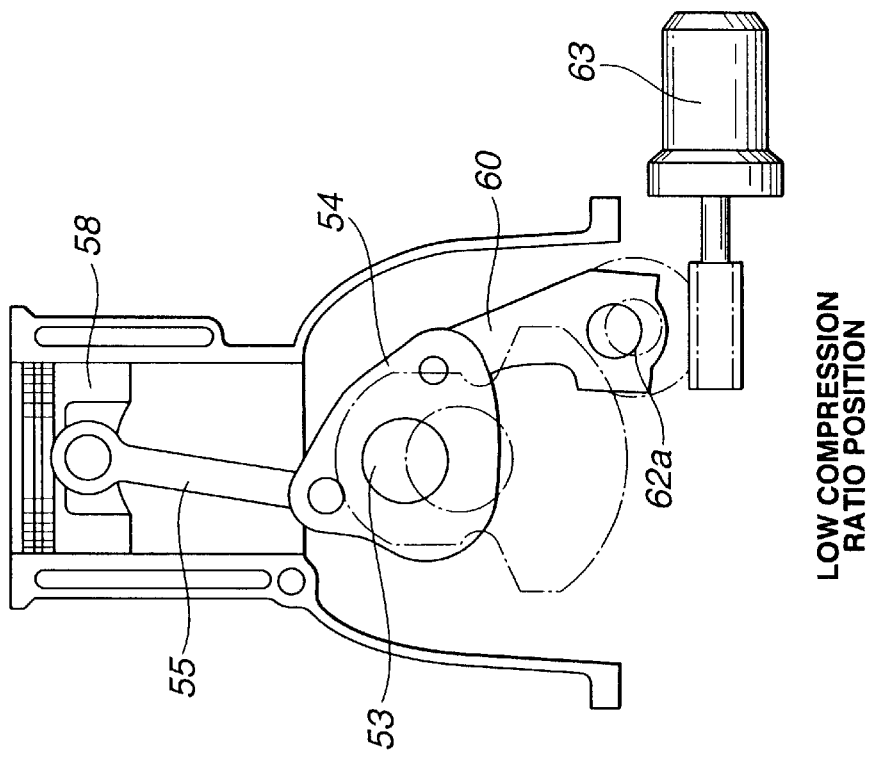
FIG.8A HIGH COMPRESSION RATIO POSITION
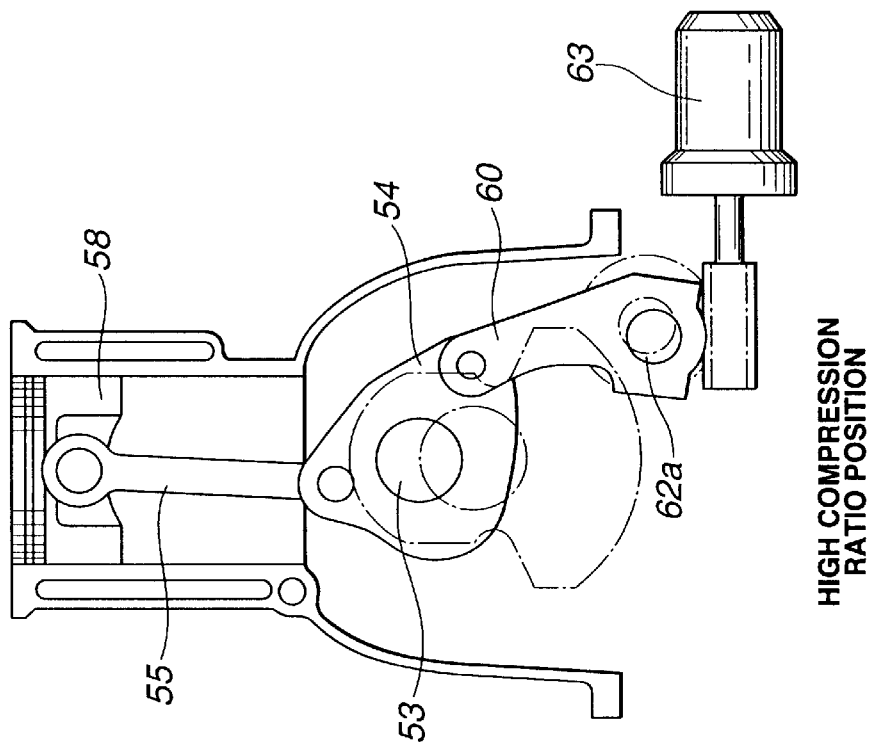
FIG.8B LOW COMPRESSION RATIO POSITION

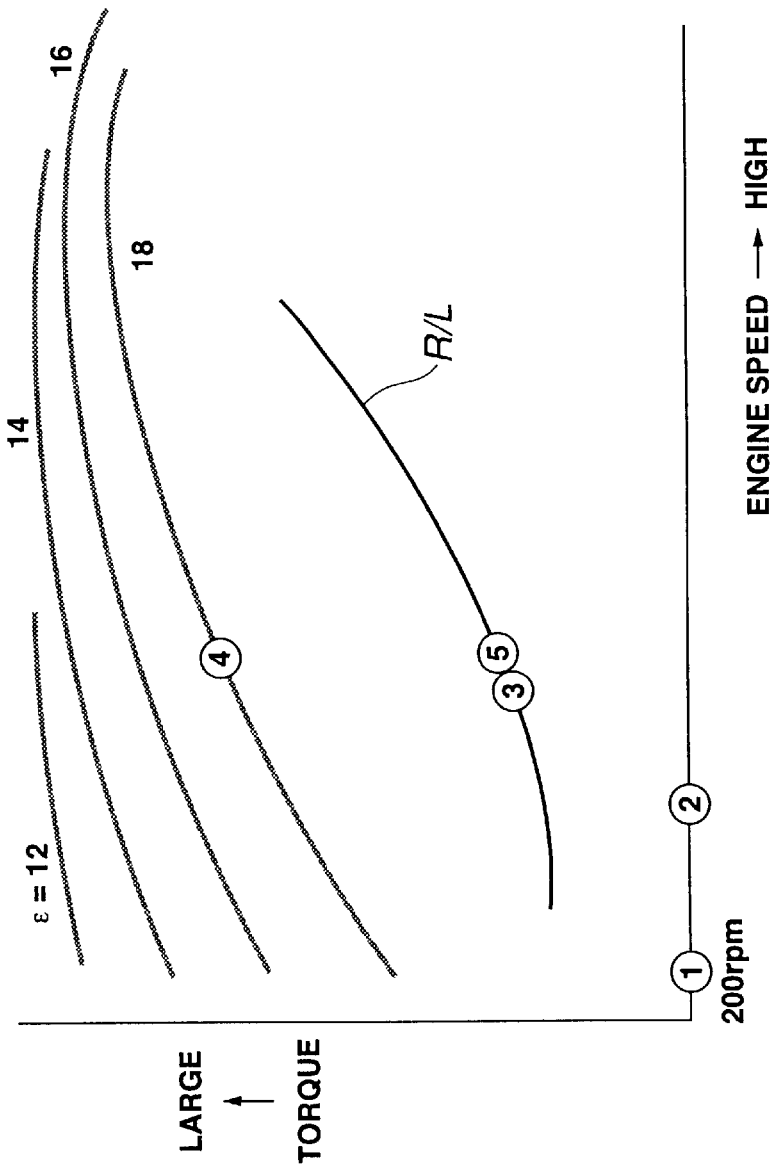

FIG.11

| | | ITEM | EFFECT ON EXHAUST TEMP. RISE |
|---|---|---|---|
| (1) | INTAKE VALVE + IT RETARD CONTROL | RETARD OF IVO<br>• DEVELOPMENT OF VACUUM IN CYLINDER<br>• INCREASE OF PISTON SPEED<br>→ INCREASE OF INTAKE AIR FLOW SPEED | ↗ |
| (2) | | MAKING INTAKE VALVE LIFT SMALLER<br>→ INCREASE OF INTAKE AIR FLOW SPEED | ↗ |
| (3) | | RETARD OF IVC<br>(RETARD FROM BDC)<br>• FALL OF ACTUAL COMPRESSION RATIO<br>• DECREASE OF INTAKE AIR CHARGING AMOUNT<br>• FALL OF INTAKE VACUUM<br>(DETERIORATION OF FUEL ATMIZATION) | ↘ |
| (4) | | ADVANCE OF IVC<br>(ADVANCE FROM BDC)<br>• FALL OF ACTUAL COMPRESSION RATIO<br>• FALL OF INTAKE AIR CHARGING AMOUNT<br>(DETERIORATION OF FUEL ATMIZATION) | ↘ |
| (5) | | IVC→BDC<br>• RISE OF ACTUAL COMPRESSION RATIO<br>• INCREASE OF INTAKE AIR CHARGING AMOUNT<br>• RISE OF INTAKE VACUUM<br>(IMPROVEMENT OF FUEL ATMIZATION) | ↗ |
| (6) | COMPRESSION RATIO ε CONTROL + IT RETARD CONTROL | ε→HIGH<br>• RISE OF TEMP. AND PRESSURE AT TDC | ↗ |
| (7) | | ε→LOW<br>• FALL OF TEMP. AND PRESSURE AT TDC | ↘ |
| (8) | COMPRESSION RATIO ε CONTROL + IT RETARD CONTROL | ε→HIGH<br>• RISE OF TEMP. AND PRESSURE AT TDC<br>(SINCE ADVANCE OF IT CAUSES EXPANSION RATIO TO INCREASE) | ↘ |

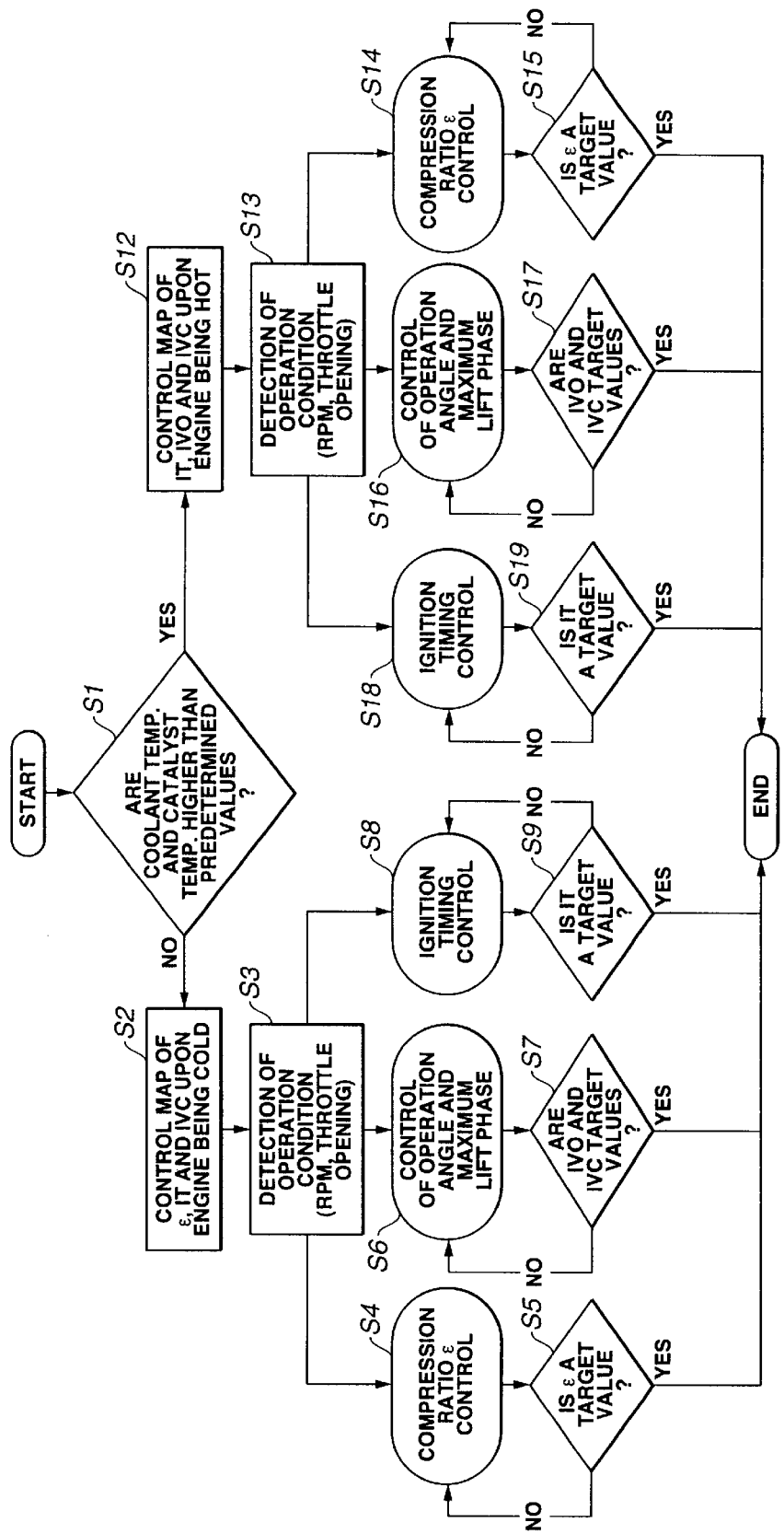

CONTROL SYSTEM AND METHOD FOR AN INTERNAL COMBUSTION ENGINE

BACKGROUND OF THE INVENTION

The present invention relates to a control system for an internal combustion engine equipped with a compression ratio control mechanism capable of varying a compression ratio, a lift and operation angle control mechanism capable of varying a lift and operation angle of an intake valve, and a phase control mechanism capable of varying a maximum lift phase of an intake valve. The present invention further relates to a method for controlling such an internal combustion engine. Still further, the present invention relates to a technique for improving the exhaust gas purifying efficiency of a spark-ignited internal combustion engine equipped with a catalytic exhaust gas purifier.

The assignee of this application has heretofore proposed a variable valve timing control mechanism that can vary the lift and operation angle of an intake valve simultaneously and continuously as disclosed in Japanese Patent Provisional Publication Nos. 11-107725 and 11-324625. The assignee has further proposed a variable valve timing control mechanism that can attain a wide design freedom of the lift characteristics in combination with a phase control mechanism for varying a maximum lift phase.

Further, it has been proposed, as disclosed in Japanese Patent Provisional Publication No. 2000-73804, a double-like type piston-crank mechanism that serves as a variable compression ratio control mechanism for a reciprocating internal combustion engine.

SUMMARY OF THE INVENTION

As is well known, an exhaust system of an internal combustion engine is provided with a catalytic exhaust gas purifier made up of an oxidation-reduction catalyst, oxidation catalyst or a reduction catalyst. However, even by the advanced catalyst technology of today, it is the present situation that the catalyst effect on the gas emitted from the engine is largely limited immediately after cold start at which the catalyst temperature is low as compared with that after warming up of the engine. This problem has long been recognized by the person skilled in the art. Thus, a continuous effort has been made to lower the active temperature of the catalyst and it has been devised to introduce the secondary air into the upstream side of the catalyst for thereby advancing the time at which the catalyst is chemically activated.

However, the fundamentals to solving such a problem are how fast the catalyst can reach the temperature at which the catalyst starts conversion. To this end, the ignition timing is delayed during warming up (i.e., the exhaust gas temperature is elevated by retarding the timing at which combustion starts). This, however, causes a bad influence on the fuel consumption but is widely exercised. However, if the ignition timing is retarded largely, there is caused a problem that the combustion becomes unstable and in the worst case a misfire is caused and therefore a large amount of unburnt substances as HC is possibly emitted. Accordingly, for largely retarding the ignition timing, it is indispensable to improve the combustion. Heretofore, it is a representative method for improving the combustion under those circumstances to provide the intake port with a swirl control valve for intensifying the gas flow within the cylinder, but this is not always sufficient.

It is accordingly an object of the present invention to provide a control system for an internal combustion engine having a compression ratio control mechanism, a lift and operation angle control mechanism and a phase control mechanism, which can provide an improved combustion control at cold engine operation and thereby attain a considerably improved exhaust gas purifying efficiency.

It is a further object of the present invention to provide a method for controlling an internal combustion engine, which is carried out by the control system of the foregoing character.

According to an aspect of the present invention, there is provided a control system for an internal combustion engine having a compression ratio control mechanism capable of varying a compression ratio of the engine, an ignition timing control system capable of varying an ignition timing of the engine, and a catalytic exhaust gas purifier disposed in an exhaust system of the engine, the control system comprising an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load.

According to another aspect of the present invention, there is provided an internal combustion engine comprising a compression ratio control mechanism capable of varying a compression ratio of the engine, an ignition timing control system capable of varying an ignition timing of the engine, a catalytic exhaust gas purifier disposed in an exhaust system of the engine and an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load.

According to a further aspect of the present invention, there is provided a method for controlling an internal combustion engine having a compression ratio control mechanism capable of varying a compression ratio of the engine, an ignition timing control system capable of varying an ignition timing of the engine, and a catalytic exhaust gas purifier disposed in an exhaust system of the engine, the method comprising controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load.

BRIEF DESCRIPTION OF THE DRAWINGS

FIG. 7 is a diagram showing piston stroke characteristics of a double-link type piston-crank mechanism serving as a compression ratio control mechanism employed in the engine of FIG. 1;

FIGS. 8A and 8B are schematic views for illustrating operations of the compression ratio control mechanism;

FIG. 9 is a diagram showing the compression ratio control characteristics of the variable compression ratio control mechanism;

FIG. 11 illustrates intake valve operation characteristics in relation to an exhaust gas temperature and an influence of compression ratio on same;

FIG. 13 is a flow chart of a control routine of a compression ratio, etc. to be executed by the control system of FIG. 1.

DESCRIPTION OF THE PREFERRED EMBODIMENT

Figure 1:
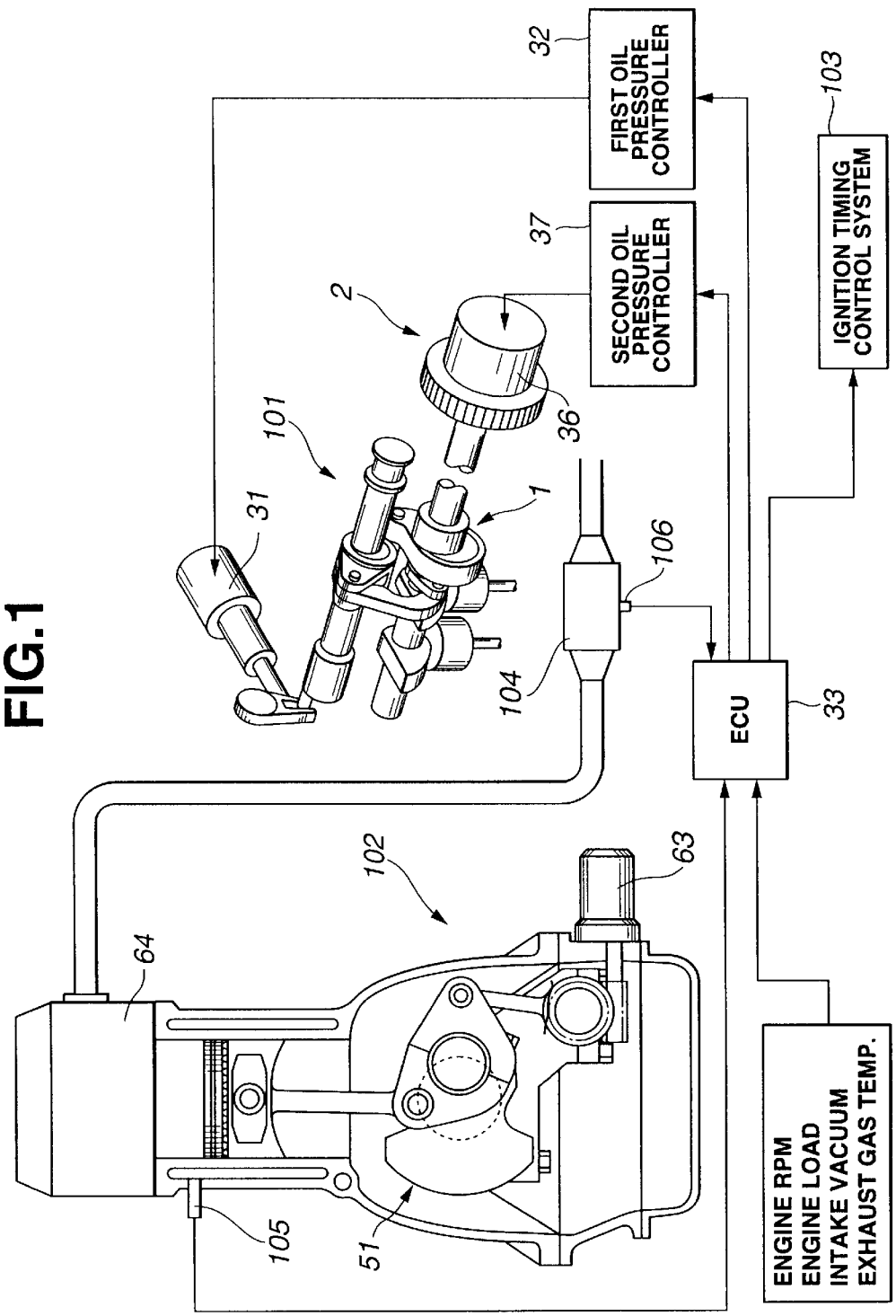
FIG. 1 is a schematic view of a control system for an internal combustion engine having a variable valve timing control apparatus, according to an embodiment of the present invention.

Referring to FIG. 1, an internal combustion engine includes variable valve timing control apparatus 101 for varying intake valve opening and closing timings, compression ratio control mechanism 102 for varying nominal compression ratio ∈ of the engine, ignition timing control system 103 for varying an ignition timing, and catalytic exhaust gas purifier 104 disposed in an exhaust system.

Figure 2:
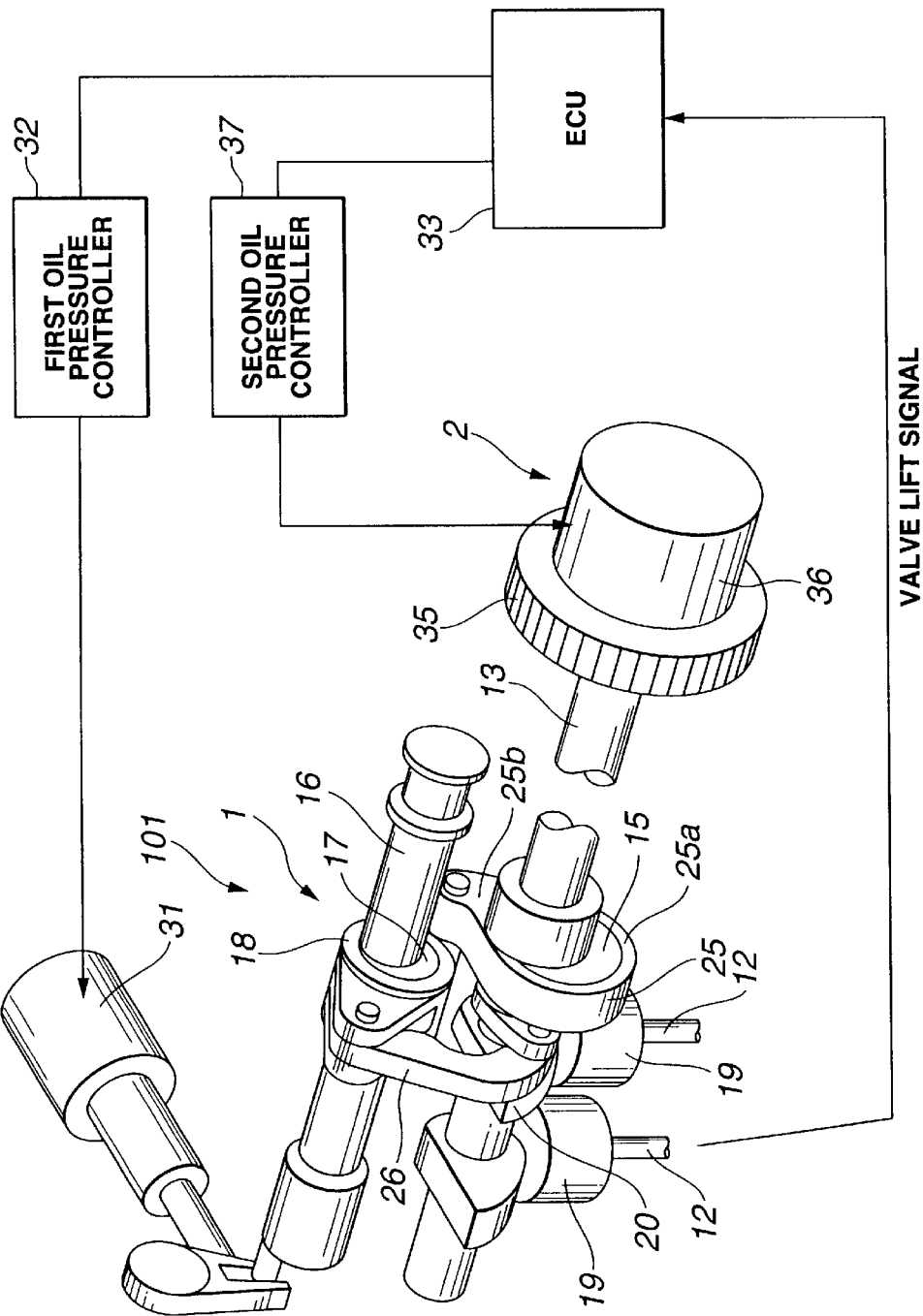
FIG. 2 is an enlarged perspective view of the variable valve timing control apparatus of FIG. 1.

Variable valve timing control apparatus 101 is shown in an enlarged scale in FIG. 2 and includes lift and operation angle control mechanism 1 for varying a lift and operation angle of intake valve 12 and phase control mechanism for varying a phase of intake valve 12, i.e., a maximum lift phase of intake valve 12 relative to a rotational phase of crankshaft 51.

Firstly, with additional reference to FIGS. 3A and 3B, lift and operation angle control mechanism 1 will be described. Lift and operation angle control mechanism 1 is structurally the same as that disclosed in Japanese Patent Provisional Publication No. 11-107725 which was assigned to the same assignee of this application, so that only brief description will be made thereto hereinafter.

Lift and operation angle control mechanism 1 includes hollow drive shaft 13 rotatably supported on cylinder head 64 by cam brackets (not shown), eccentric cam 15 force-fitted or otherwise fixedly attached to drive shaft 13, control shaft 16 disposed above and in parallel with drive shaft 13 and rotatably supported on cylinder head 64 by the above described cam brackets, rocker arm 18 mounted on eccentric cam portion 17 of control shaft 16 for oscillation motion, and oscillation cam 20 engaging tappet 19 provided to an upper end portion of intake valve 12. Eccentric cam 15 and rocker arm 18 are operatively connected by pivotal link 25, and rocker arm 18 and oscillation cam 20 are operatively connected by connecting rod 26.

Drive shaft 13 is driven by crankshaft 51 of the engine by way of a timing chain or timing belt (not shown).

Eccentric cam 15 has a circular external surface the center of which is offset from a rotational axis of drive shaft 13 by a predetermined amount. On the circular external surface is rotatably fitted or mounted annular base portion 25a of pivotal link 25.

Rocker arm 18 is mounted at a central portion thereof on eccentric cam portion 17 and has an end portion to which protruded arm portion 25b of above described pivotal link 25 is pivotally connected and another end portion to which an upper end portion of connecting rod 26 is pivotally connected. Eccentric cam portion 17 has a geometric center that is offset from the rotational axis of control shaft 16 so that an axis of oscillation of rocker arm 18 varies depending upon a variation of a rotational position or phase of control shaft 16.

Oscillation cam 20 is rotatably mounted on drive shaft 13 and has laterally protruded end portion 20a to which a lower end portion of connecting link 26 is pivotally connected. Oscillation cam 20 has at its lower side thereof basic circular or dwell surface 24a and cam or lift surface 24b extending from basic circular surface 24a toward above described end portion 20a so as to have a predetermined curved profile. Basic circular surface 24a and cam surface 24b are brought into engagement with the upper surface of tappet 19 in response to oscillation of oscillation cam 20.

Namely, basic circular surface 24a serves as a base circle area that regulates an amount of lift to zero. When oscillation cam 20 is turned or rotated to bring cam surface 24b serving as a lift or rise area into contact with tappet 19, there is caused a lift of intake valve 12 that increases gradually with further rotation of oscillation cam 20. In the meantime, between the basic circular area and the lift area is provided a small ramp area.

Control shaft 16 is constructed so as to be rotatable within a predetermined rotational angle range by being driven by hydraulic, lift and operation angle control actuator 31 installed on an end of control shaft 16 as shown in FIGS. 1 and 2. Supply of hydraulic pressure to actuator 31 is performed by first hydraulic pressure controller 32 in response to a control signal from engine control unit (ECU) 33.

The operation of lift and operation angle control mechanism 1 will now be described. Rotation of drive shaft 13 causes pivotal link 25 to move up and down by the operation of eccentric cam 15. By this, rocker arm 18 is caused to oscillate. This oscillating movement of rocker arm 18 causes oscillation cam 20 to oscillate. By oscillating motion of oscillation cam 20, tappet 19 is caused to move up and down, causing intake valve 19 to open and close.

In this connection, when the rotational position or phase of control shaft 16 is varied by actuator 31, the initial position of rocker arm 18 is caused to vary, and therefore the initial position of oscillation cam 20 is caused to vary.

Figure 3A:
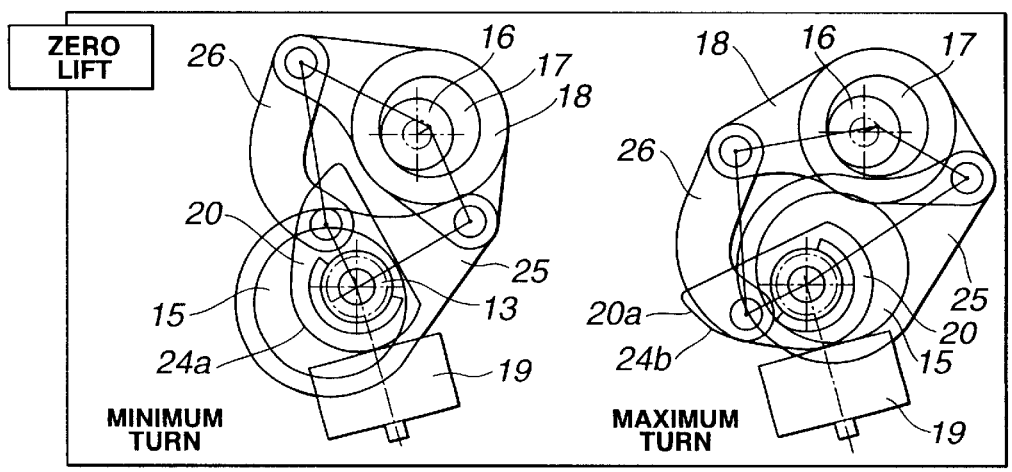
FIGS. 3A and 3B are schematic views for illustrating an operation of a lift and operation angle control mechanism of the variable valve timing control apparatus of FIG. 1.

For example, when eccentric cam portion 17 is generally positioned in a higher place as shown in FIG. 3A, i.e., when the geometric center of eccentric cam portion 17 is located above the rotational axis of control shaft 16, rocker arm 18 is bodily moved into a higher place, thus causing end portion 20a of oscillation cam 20 to be moved into a higher position. Namely, when oscillation cam 20 is rotated into the initial position, cam surface 24b is caused to incline away from tappet 19. Accordingly, when oscillation cam 20 is caused to oscillate in response to rotation of drive shaft 13, basic circular surface 24a is brought into contact with tappet 19 for a longer period, whereas cam surface 24b is brought into contact with tappet 19 for a shorter period. Accordingly, the amount of lift is small, and an angular range from an opening timing to a closing timing, i.e., the operation angle is reduced.

Figure 3B:
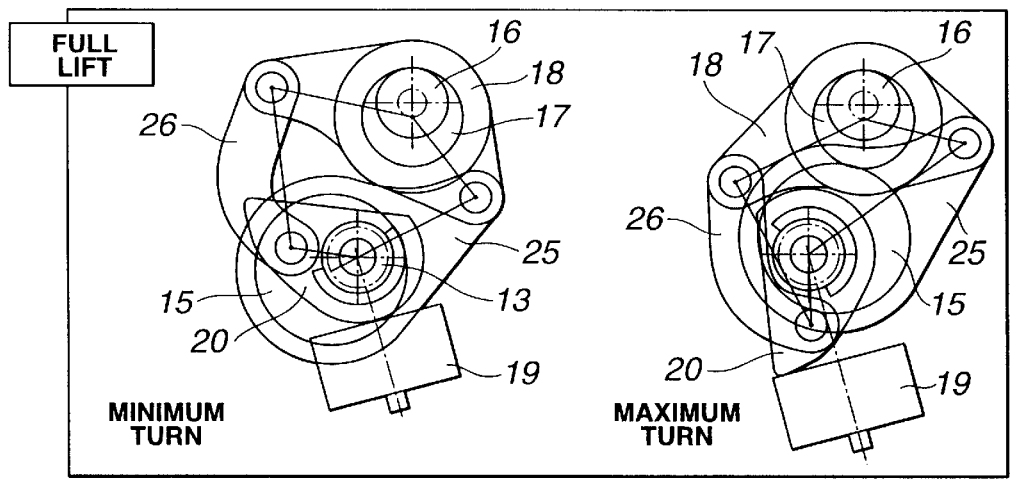

On the contrary, eccentric cam portion 17 is generally positioned in a lower place as shown in FIG. 3B, rocker arm 18 is bodily moved into a lower place, thus causing end portion 20a of oscillation cam 20 to move into a lower position. Namely, when oscillation cam 20 is rotated into the initial position, cam surface 24b is caused to incline toward tappet 19. Accordingly, when oscillation cam 20 oscillates in response to rotation of drive shaft 13, the place where oscillation cam 20 is brought into contact with tappet 19 changes immediately from basic circular surface 24a to cam surface 24b. Accordingly, the amount of lift becomes larger and the operation angle is enlarged.

Figure 4:
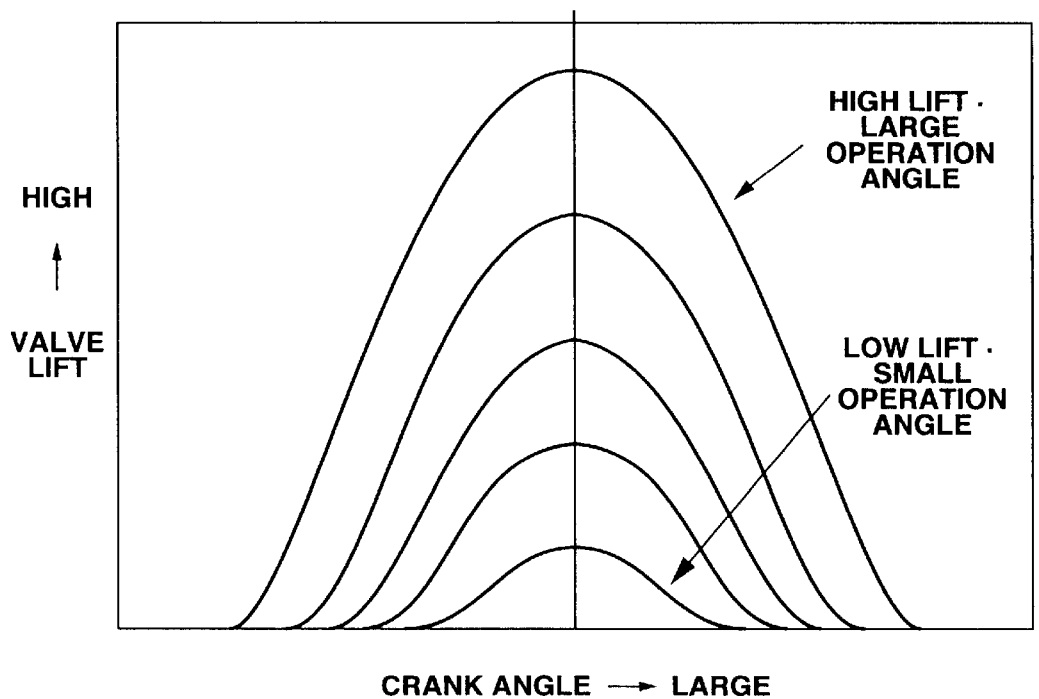
FIG. 4 is a diagram showing the lift and operation angle variation characteristics of the lift and operation angle control mechanism of the variable valve timing control apparatus of FIG. 1.

Since the position of eccentric cam portion 17 can be varied continuously, the lift and operation angle characteristics of intake valve 12 can be varied continuously as shown in FIG. 4. Namely, both of the lift and operation angle can be increased and decreased simultaneously and continuously. Particularly, by lift and operation angle control mechanism 1, the opening and closing timings are varied so as to be nearly symmetrical with respect to the maximum lift phase, in response to a variation of the lift and operation angle.

Figure 5:
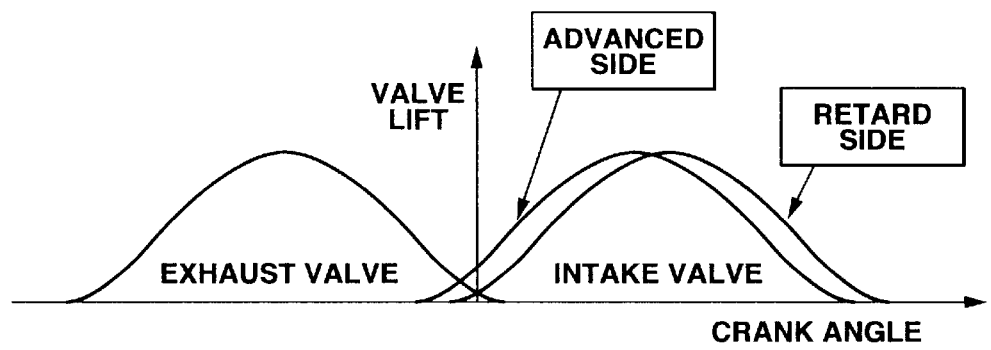
FIG. 5 is a diagram showing phase variation characteristics of a phase control mechanism of the variable valve timing control apparatus of FIG. 1.

As shown in FIG. 2, phase control mechanism 2 includes sprocket 35 provided to a front end portion of drive shaft 13, and hydraulic, phase control actuator 36 for rotating sprocket 35 relative to drive shaft 13 within a predetermined angular range. Sprocket 35 is drivingly connected to crankshaft 51 by way of the timing chain or timing belt (not shown) so as to be rotatable in timed relation to crankshaft 51. Supply of oil pressure to actuator 36 is controlled by second oil pressure controller 37 in response to a signal from engine control unit (ECU) 33. By the control of oil pressure to be supplied to actuator 36, sprocket 35 and drive shaft 13 are rotated relative to each other and the valve timing or phase is advanced or retarded as shown in FIG. 5. Namely, the curve representative of the valve lift characteristics does not change itself but is advanced or retarded in its entirety. Further, such a variation can be attained continuously. Phase control mechanism 2 is not limited to the hydraulic type but can have various other structures such as one utilizing an electromagnetic actuator.

Lift and operation angle control mechanism 1 and phase control mechanism 2 can be open-loop controlled by using sensors (not shown) for detecting an actual lift, operation angle and maximum lift phase or can be simply closed-loop controlled in response to an engine operating condition.

Figure 6:
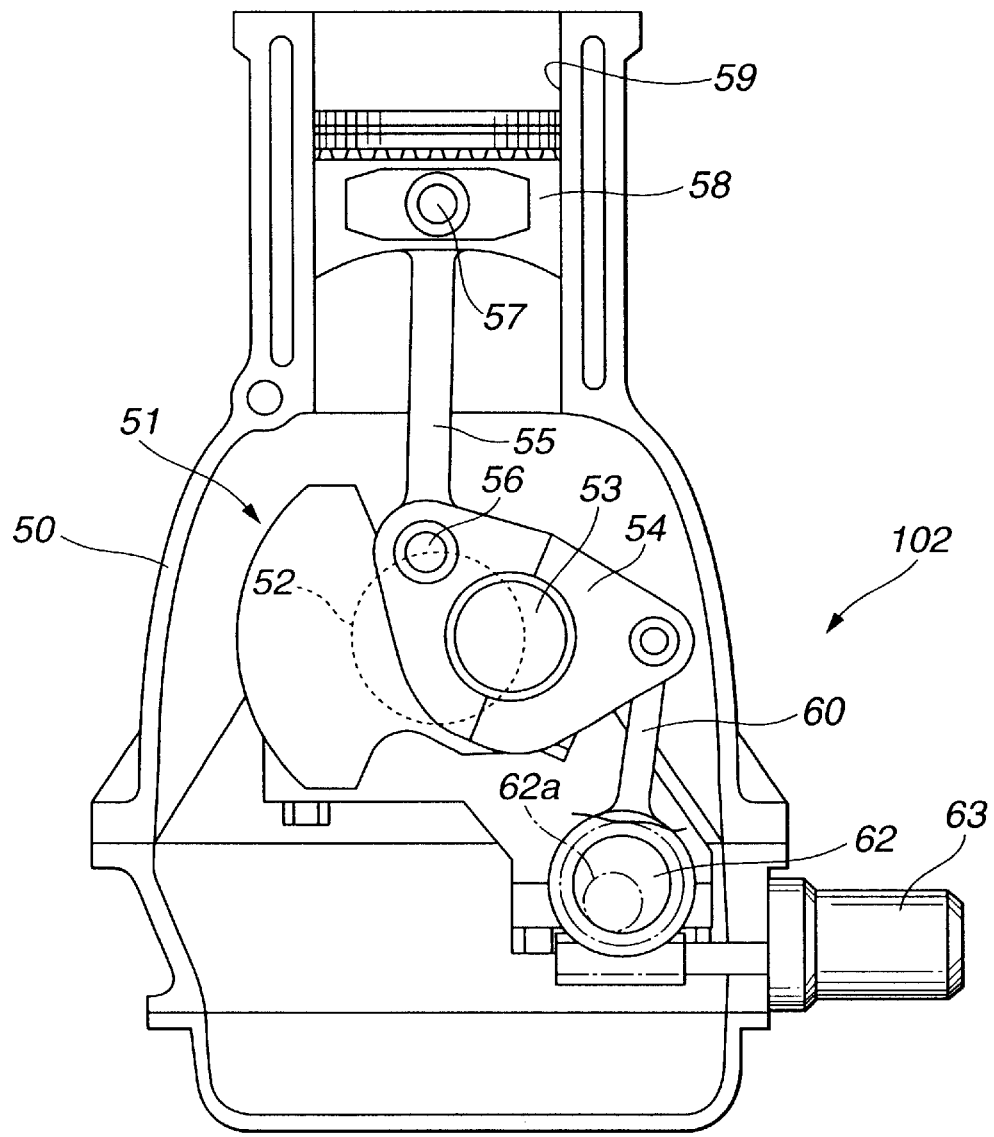
FIG. 6 is an enlarged schematic view of the engine of FIG. 1.

FIG. 6 shows a compression ratio control mechanism 102.

Compression ratio control mechanism 102 includes crankshaft 51 having a plurality of journal portions 52 and a plurality of crank pins 53. On main bearings (not shown) installed on cylinder block 50 are rotatably supported journal portions 52. Crank pins 53 are offset from journal portions 52 by a predetermined amount. To each crank pin 53 is swingably or pivotally connected lower link 54 serving as a second link.

Lower link 54 is nearly T-shaped and made up of two separable sections. Nearly at a central portion of lower link 54 and between the separable sections is formed a connecting hole in which crank pin 53 is fitted.

Upper link 55 serving as a first link is pivotally connected at a lower end to one end of lower link 54 by means of connecting pin 56 and at an upper end to piston 58 by means of piston pin 57. Piston 58 is subjected to a combustion pressure and reciprocates within cylinder 59 of cylinder block 50. Above cylinder 59 are disposed intake valves 12 and exhaust valves (not shown).

Control link 60 that serves as a third link is pivotally connected at an upper end to the other end of lower link 54 by means of connecting pin 61 and at a lower end to the engine main body such as cylinder block 50 by way of control shaft 62. More specifically, control shaft 62 is rotatably mounted on the engine main body and has eccentric cam portion 62a to which the lower end of control link 60 is pivotally connected.

Rotational position of control shaft 62 is controlled by compression ratio control actuator 63 using an electric motor in response to a signal from engine control unit 33 (refer to FIG. 1).

In above described compression ratio control mechanism 102 using a double-link type piston crank mechanism, when control shaft 62 is turned by compression ratio control actuator 63, the center of eccentric cam portion 62a is moved relative to the engine main body. This causes a variation of the position at which the lower end of control link 60 is pivotally supported on the engine main body. This in turn causes a variation in the stroke of piston 58, thus causing the position of piston 58 at the top dead center (TDC) to become higher or lower as shown in FIGS. 8A and 8B. By this, it becomes possible to change the compression ratio. FIGS. 8A and 8B show a high compression ratio condition and a low compression ratio condition, respectively. The compression ratio can be varied continuously between the high compression condition and low compression condition.

Above described double-link type compression ratio control mechanism 102 can attain such piston crank stroke characteristics that approximates a single harmonic motion as shown in FIG. 7 by suitably selecting the link dimensions. The stroke characteristics approximating a single harmonic motion has an advantage in vibration noise, particularly in that the piston speed at or adjacent TDC is slower by about 20% as compared with an usual single-link type piston crank mechanism. This is an advantage in formation and development of initial flame kernel under the condition of slow combustion speed, e.g., at the time of cold engine.

The compression ratio control characteristics of above described compression ratio control mechanism 102 are shown in FIG. 9. In the meantime, the compression ratio is a geometrical compression ratio $\epsilon$ that is determined depending upon only a volumetric variation of the combustion chamber that is caused by stroke of piston 58. In compression ratio control mechanism 102 that is combined with variable ignition timing control apparatus 101, the actual compression ratio is finally determined by the control of the intake valve closing timing. Namely, when intake valve 12 is closed in the middle of the intake stroke, compression is actually started from a crank angle position that is symmetrical, with respect to BDC, to the crank angle position at which intake valve 12 is closed. Thus, even if a nominal compression ratio $\epsilon$ is high, the actual compression ratio is lowered when the intake valve closing timing is earlier than BDC.

Figure 10:
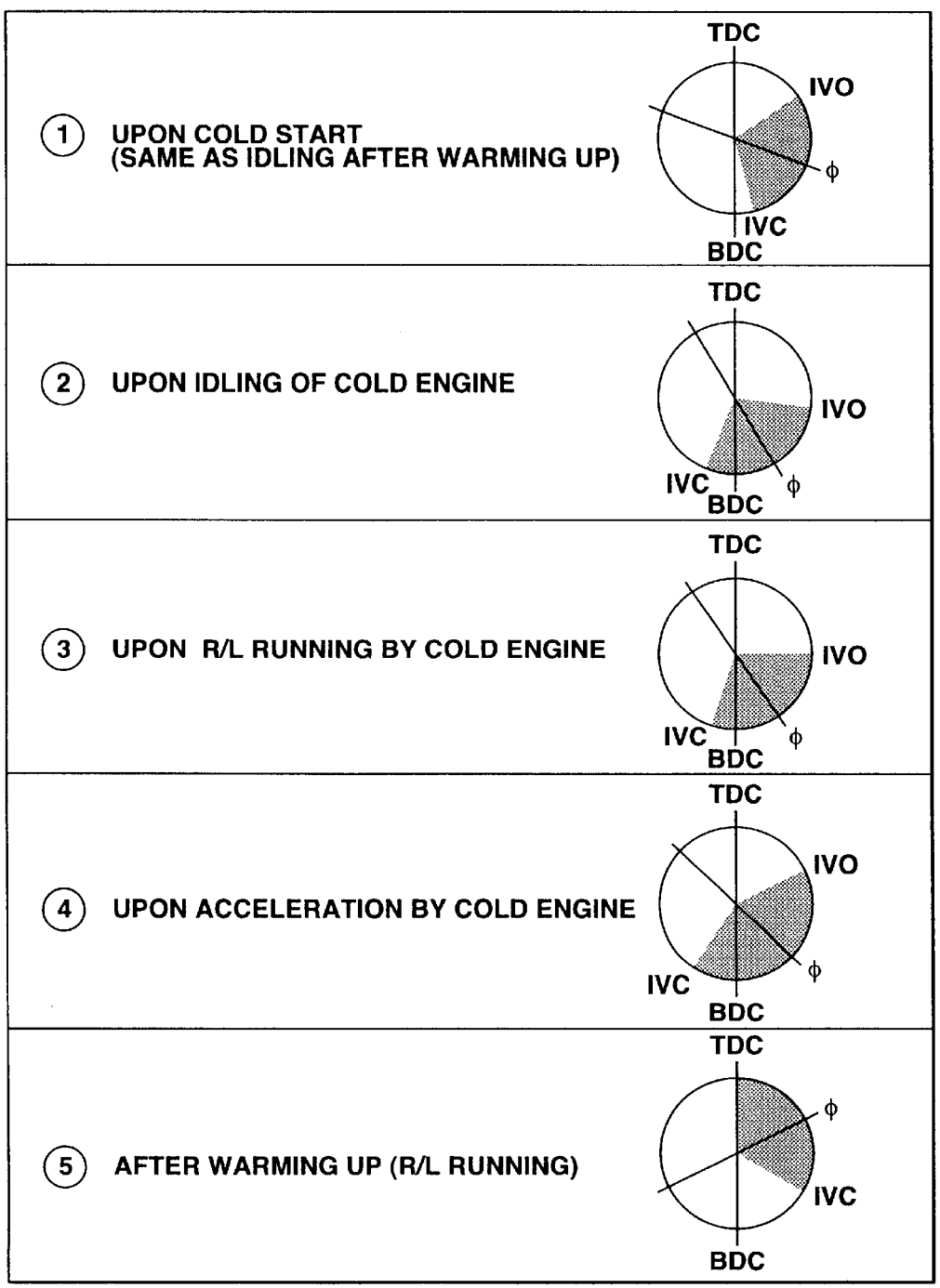
FIG. 10 is a diagram of valve lift characteristics obtained by the control system of the present invention in relation to representative operating conditions of the engine.

FIG. 10 shows the intake valve opening and closing timing control by variable valve timing control apparatus 101 under typical vehicle driving conditions. In the meantime, corresponding points (or zones) to the driving conditions are added to FIG. 9. In this instance, ① to ④ are the characteristics upon cold engine operation according to the present invention, and only ⑤ is the characteristics after warming up of the engine (i.e., when the engine is hot), that are shown for reference. Further, the characteristics upon cold start are the same as the characteristics upon idling after warming up of the engine. As shown in FIG. 1, the temperature condition or warm-up condition of the engine is determined by one of or both of coolant temperature sensor 105 provided to, for example, cylinder block 50 of the engine and catalyst temperature sensor 106 provided to catalytic exhaust gas purifier 104.

As shown, in the characteristics ① upon cold engine operation, the operation angle is set to be small and the maximum lift phase φ is retarded so that the intake valve closing timing is set at a point a little earlier than BDC. Since the intake valve closing timing is set at a point adjacent BDC, decrease of the actual compression ratio is not caused. In the characteristics ② upon high idling of cold engine and the characteristics ③ upon R/L (road load) running by cold engine, the operation angle is maintained small and the maximum lift phase is further retarded so that the intake valve opening timing is retarded as much as possible. Though the intake valve closing timing is after BDC, it is set at a point adjacent BDC and therefore decrease of the actual compression ratio is small. In the meantime, the ignition timing is retarded for warming up the catalyst of catalytic exhaust gas purifier 104. Upon high idling of cold engine, the degree of retardation of the ignition timing is maximized though varies depending upon the combustion condition. Namely, the ignition timing is retarded largely from an MBT (Minimum Spark Advance for Best Torque) point. In the characteristics ④ upon acceleration by cold engine, for the necessity of making higher the intake air charging efficiency, the operation angle is enlarged and the intake valve opening timing is advanced. The intake valve closing timing is after TDC. In the characteristics ⑤ upon R/L running after warming up, the intake valve opening timing is determined to be TDC for preventing production of vacuum and the intake valve closing timing is determined so as to advance considerably from BDC. By this, though the actual compression ratio is lowered, the nominal compression ratio ε is set to be high, thus making it possible to attain an effective pump loss reducing effect by the combination of the actual compression ratio and the nominal compression ratio. The R/L running is herein used to indicate running of the vehicle wherein the engine speed and engine load are constant and the throttle opening is ¼ of full throttle.

FIG. 11 is a list for illustrating the effect of the intake valve operation characteristics and the compression ratio on the exhaust gas temperature when the engine is cold. In this instance, an exhaust gas temperature raising effect is shown by an arrow, i.e., the arrow directed upward indicates that the effect contributes to exhaust gas temperature rise and the arrow head directed downward indicates that the effect is bad for exhaust gas temperature rise. In the meantime, the exhaust gas temperature raising effect herein referred to is synonymous with how much the ignition timing can be retarded by the improvement of combustion. Hereinafter, description will be made to each item.

(1) Retard (Retard from TDC) of Intake Valve Opening Timing (IVO)

When this is the case, intake air is not introduced into the cylinder at the initial stage of the intake stroke so that the vacuum within the cylinder increases rapidly. Further, the piston speed is maximized at the center of the stroke and simply increases as it moves from TDC to the center of the stroke. Thus, when the intake valve opening timing is retarded, the intake air flow speed becomes large when the intake valve is opened. Increase of the vacuum within the cylinder causes increase of the pumping loss, but increase of pumping loss causes a rise of the intake air temperature. Increase of the intake air flow speed is largely effective for promoting atomization of the fuel injected into the intake port. Further, since the combustion speed itself increases in accordance with the degree of turbulence of the intake air, the ignition timing can be retarded by the amount corresponding to increase of the combustion speed.

(2) Making Intake Valve Lift Smaller

When the intake valve lift is small, the intake air flow speed is increased by the amount corresponding to decrease of the opening area of the intake port. Particularly, there is a nozzle effect (effect of minimum restricted portion) between the intake valve and the seat. Such nozzle effect is largely effective for promoting atomization of the fuel injected into the intake port.

(3) Retard (Retard from BDC) of Intake Valve Closing Timing (IVC)

By retarding the intake valve closing timing from BDC, the actual compression ratio is lowered. This is because the air-fuel mixture drawn into the cylinder is caused to flow backward at the initial stage of the compression stroke. As a matter of course, such retard is accompanied by decrease of the charging efficiency and therefore the intake vacuum is lowered. Decrease of the actual compression ratio causes the temperature of the air-fuel mixture at the time of compression to fall, thus lowering the combustion speed and imposing restrictions on retard of the ignition timing.

Further, decrease of the intake vacuum deteriorates atomization of fuel and is therefore causative of lowering the combustion speed.

(4) Advance (Advance from BDC) of Intake Valve Closing Timing (IVC)

When the intake valve closing timing is advanced to a point before BDC, the actual compression ratio is lowered similarly to the above-described retard of the intake valve closing timing. This is because, differing in phenomenon from retard of the intake valve closing timing, the mixture drawn into the cylinder is expanded adiabatically until BDC after closure of the intake valve and therefore the temperature of the mixture at BDC is lowered. As a matter of course, such advance is accompanied by lowering of the charging efficiency and therefore the intake vacuum is lowered. Accordingly, the combustion speed is lowered to put restrictions on retard of the ignition timing.

(5) In Case of Making Intake Valve Closing Timing Closer to BDC

In this case, reversely to the above-described characteristics ③ and ④, the actual compression ratio is elevated and the intake vacuum is intensified, thus causing the combustion temperature to rise and the retard limit of the ignition timing is enlarged.

(6) In Case of Making Compression Ratio ε Higher

When the compression ratio ε is made higher, the temperature at or adjacent TDC is caused to rise. Thus, good combustion can be attained even if the ignition timing is retarded. Further, though the expansion ratio is increased, the retard limit is enlarged by the corresponding amount, particularly when a curve representative of the piston stroke characteristics is close to a single harmonic vibration, thus making it possible to obtain an effect capable of offsetting increase of the expansion ratio sufficiently.

(7) In Case of Making the Compression Ratio ε Smaller

When the compression ratio ε is made smaller; the temperature of the mixture when the piston is at or adjacent TDC is lowered, thus causing the combustion speed to be lower and the ignition timing to be restricted. This is well over the influence of decrease of expansion ratio.

(8) In Case of Making the Compression Ratio Higher and Not Retarding the Ignition Timing (for Reference)

Combustion becomes better and the compression ratio is increased, thus allowing the efficiency to become better. Accordingly, the temperature of the exhaust gas is lowered.

Figure 12:
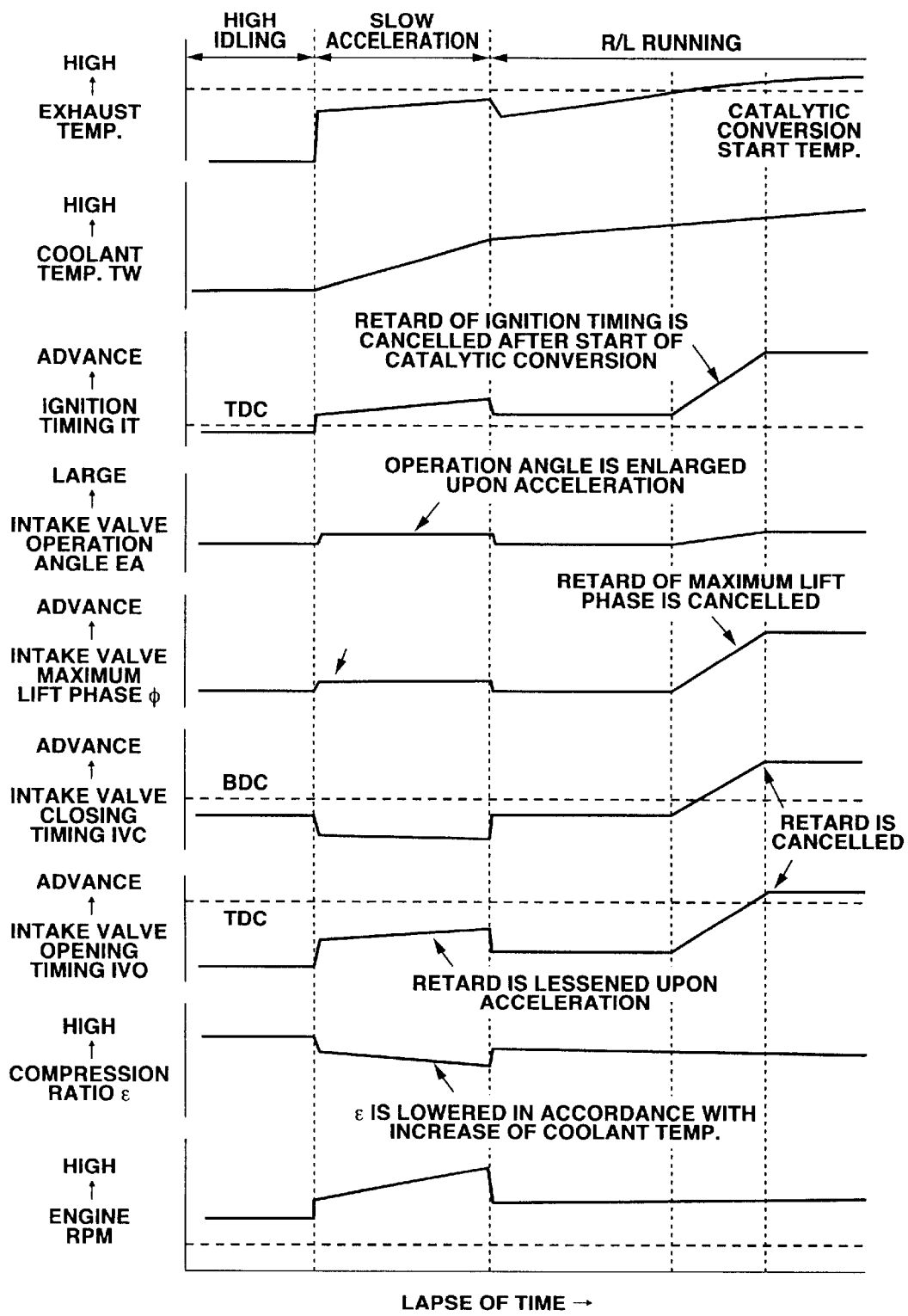
FIG. 12 is a time chart of operations of various portions of the engine after cold start.

FIG. 12 is a time chart for illustrating a control performed at the transition from the high idling condition after cold start to the R/L running through the slow acceleration. When the engine in a cold condition is started and put into self-sustaining operation, the rpm is set higher than that at idling after warming up, i.e., the engine is put into a so-called high idling condition. From this time onward, it is necessary to make a control for maximizing the exhaust gas temperature for exhaust gas purification.

In this example, upon high idling, the compression ratio $\epsilon$ is set high, and at the same time the characteristics of the intake valve is varied in such a manner that the operation angle is made smaller (this is for enlarging the freedom of retardation) and the intake valve opening timing (IVO) is retarded largely in combination with retard of the maximum lift phase $\phi$. In this instance, the intake valve closing timing (IVC) is set at a point after BDC. This is for retarding the intake valve opening timing (IVO) maximumly. However, the intake valve opening timing (IVO) is set at a point adjacent BDC, though after BDC, so that the influence on the actual compression ratio is small. Upon this high idling, the degree of retard of the ignition timing is maximized though varies depending upon the combustion condition.

When the vehicle operating condition is changed from high idling to acceleration, the compression ratio $\epsilon$ is a little lowered from the maximum value but still set to be high. Since the coolant temperature rises gradually, the compression ratio $\epsilon$ is lowered gradually in accordance with a rise of the coolant temperature. Catalytic exhaust gas purifier 104 soon reaches the conversion starting temperature. From this time onward, retard of the ignition timing is cancelled gradually and the control is varied so that the intake valve opening timing (IVO) and the intake valve closing timing (IVC) are regulated to the target values.

FIG. 13 is a flow chart of a control routine to be executed by the control system of this invention when the engine is cold or hot. Firstly, in step S1, it is judged whether the coolant temperature and the catalyst temperature are equal to or higher than respective predetermined temperatures and then it is judged, based on the judgment on the coolant temperature and the catalyst temperature, whether the engine is cold or hot. When the engine is judged cold, the program proceeds to step S2. In step S2, selection of maps for respective control of the compression ratio $\epsilon$, ignition timing IT, intake valve opening timing (IVO) and intake valve closing timing (IVC) is made. In step S3, an actual engine operating condition (engine rpm, throttle opening degree) at that time is detected and a control corresponding to the detected engine operating condition is made on the basis of the selected maps. Namely, in steps S4 and S5, variable compression ratio control mechanism 102 is controlled so that the compression ratio $\epsilon$ becomes equal to a target value. In steps S6 and S7, lift and operation angle control mechanism 1 and phase control mechanism 2 are controlled so that the intake valve opening timing (IVO) and the intake valve closing timing (IVC) become equal to respective target values. Further, in steps S8 and S9, ignition timing control system 103 is controlled so that the ignition timing IT becomes equal to a target value.

When the engine is judged hot in step S1, the control proceeds to step S12 to select control maps for hot engine. From this step onward, a control similar to that described above is carried out. Namely, steps S12 to S19 correspond to steps S2 to S9, respectively, so that a repeated description thereto is omitted.

In the foregoing, it is to be noted that the above described control of variable valve timing apparatus 101 and compression ratio control mechanism 102 are executed by a control program incorporated in ECU 33.

From the foregoing, it will be understood that according to the present invention, the exhaust gas temperature can be raised efficiently without deteriorating the combustion. Namely, by raising the compression ratio (i.e., nominal compression ratio $\epsilon$), the temperature of the mixture when the piston is adjacent TDC becomes higher. By this, it becomes possible to obtain good combustion even if the ignition timing is retarded largely. In this connection, while the expansion ratio increases as the compression ratio becomes higher, the exhaust gas temperature becomes higher since the limit of retardation of the ignition timing is enlarged.

It will be further understood that according to the present invention, the lift and operation angle are set to be small when the engine is cold. By this, it becomes possible to retard the ignition timing largely and attain an efficient rise of the exhaust gas temperature.

It will be further understood that according to the present invention, the compression ratio control mechanism is constructed so that reciprocating motion of the piston of the engine in response to rotation of the crankshaft approximates to a single harmonic motion. This is effective for obtaining stable combustion even when the engine is cold.

The entire contents of Japanese Patent Application No. 2001-89326 are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A control system for an internal combustion engine having a compression ratio control mechanism capable of varying a compression ratio of the engine, an ignition timing control system capable of varying an ignition timing of the engine, and a catalytic exhaust gas purifier disposed in an exhaust system of the engine, the control system comprising:

an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load, wherein the compression ratio control mechanism is constructed so that reciprocating motion of a piston of the engine in response to rotation of a crankshaft approximates a single harmonic motion.

2. A control system according to claim 1, wherein the engine further includes a lift and operation angle control mechanism capable of varying a lift and operation angle of an intake valve of the engine simultaneously and continuously, and wherein the engine control unit controls the lift and operation angle control mechanism so that the lift and operation angle are varied continuously depending upon variations of the engine rpm and the engine load and that when the engine is cold, the lift and operation angle are set to be small.

3. A control system according to claim 2, wherein the engine further includes a phase control mechanism capable of varying a maximum lift phase of the intake valve, and wherein the engine control unit controls the phase control mechanism so that when the engine is cold, the maximum lift phase of the intake valve is retarded so as to retard an intake valve opening timing to a point after an intake top dead center.

4. A control system according to claim 3, wherein the engine control unit controls the phase control mechanism so that retard of the maximum lift phase is set to be large when the lift and the operation angle are small.

5. A control system according to claim 4, wherein the engine control unit controls the phase control mechanism so that when the engine is cold, an intake valve closing timing is set at a point closer to an intake bottom dead center than a point at which the intake valve closing timing is set after the engine is warmed up.

6. A control system according to claim 1, wherein the engine control unit controls the ignition timing control system so that when the engine is cold, the ignition timing is retarded to a point adjacent or after a compression top dead center.

7. A control system according to claim 1, wherein the engine control unit controls so that the engine rpm at cold idling is controlled higher than that at idling after warm-up.

8. A control system for an internal combustion engine having a compression ratio control mechanism capable of varying a compression ratio of the engine, an ignition timing control system capable of varying an ignition timing of the engine, and a catalytic exhaust gas purifier disposed in an exhaust system of the engine, the control system comprising:

an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load, wherein the engine further includes a lift and operation angle control mechanism capable of varying a lift and operation angle of an intake valve of the engine simultaneously and continuously, and wherein the engine control unit controls the lift and operation angle control mechanism so that the lift and operation angle are varied continuously depending upon variations of the engine rpm and the engine load and that when the engine is cold, the lift and operation angle are set to be small, wherein the engine further includes a phase control mechanism capable of varying a maximum lift phase of the intake valve, and wherein the engine control unit controls the phase control mechanism so that when the engine is cold, the maximum lift phase of the intake valve is retarded so as to retard an intake valve opening timing to a point after an intake top dead center, wherein the engine control unit controls the phase control mechanism so that retard of the maximum lift phase is set to be large when the lift and the operation angle are small, wherein the engine control unit controls the phase control mechanism so that at idling after the engine is warmed up, an intake valve closing timing is set at a point adjacent the intake bottom dead center.

9. A control system for an internal combustion engine having a compression ratio control mechanism capable of varying a compression ratio of the engine, an ignition timing control system capable of varying an ignition timing of the engine, and a catalytic exhaust gas purifier disposed in an exhaust system of the engine, the control system comprising:

an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load, wherein the engine control unit controls the ignition timing control system so that retard of the ignition timing is decreased gradually with increase of the engine load.

10. An internal combustion engine comprising:

a compression ratio control mechanism capable of varying a compression ratio of the engine;

an ignition timing control system capable of varying an ignition timing of the engine; and an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load, wherein the compression ratio control mechanism is constructed so that reciprocating motion of a piston of the engine in response to rotation of a crankshaft approximates a single harmonic motion.

11. An internal combustion engine according to claim 10, wherein the compression ratio control mechanism includes a first link connected at one of opposite ends to a piston pin of a piston of the engine, a second link connecting between the other of the opposite ends of the first link and a crank pin of a crankshaft of the engine, and a third link connected at one of opposite ends to the second link and at the other of the opposite ends to a main body of the engine.

12. An internal combustion engine according to claim 11, wherein the engine control unit controls the compression ratio control mechanism so that a support point of the third link with respect to the main body of the engine varies depending upon a variation of an operating condition of the engine thereby varying the compression ratio.

13. An internal combustion engine according to claim 10, further comprising a lift and operation angle control mechanism capable of varying a lift and operation angle of an intake valve of the engine simultaneously and continuously, wherein the engine control unit controls the lift and operation angle control mechanism so that the lift and operation angle are varied continuously depending upon variations of engine rpm and engine load and that when the engine is cold, the lift and operation angle are set to be small.

14. An internal combustion engine according to claim 13, further comprising a phase control mechanism capable of varying a maximum lift phase of the intake valve, wherein the engine control unit controls the phase control mechanism so that when the engine is cold, the maximum lift phase of the intake valve is retarded so as to retard an intake valve opening timing to a point after an intake top dead center.

15. An internal combustion engine according to claim 14, wherein the engine control unit controls the phase control mechanism so that retard of the maximum lift phase is set to be large when the lift and the operation angle are small.

16. An internal combustion engine according to claim 15, wherein the engine control unit controls the phase control mechanism so that when the engine is cold, an intake valve closing timing is set at a point closer to an intake bottom dead center than a point at which the intake valve closing timing is set after the engine is warmed up.

17. A control system according to claim 10, wherein the engine control unit controls the ignition timing control system so that when the engine is cold, the ignition timing is retarded to a point adjacent or after a compression top dead center.

18. An internal combustion engine comprising:
a compression ratio control mechanism capable of varying a compression ratio of the engine;
an ignition timing control system capable of varying an ignition timing of the engine;
an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load;
a lift and operation angle control mechanism capable of varying a lift and operation angle of an intake valve of the engine simultaneously and continuously, wherein the engine control unit controls the lift and operation angle control mechanism so that the lift and operation angle are varied continuously depending upon variations of engine rpm and engine load and that when the engine is cold, the lift and operation angle are set to be small; and
a phase control mechanism capable of varying a maximum lift phase of the intake valve, wherein the engine control unit controls the phase control mechanism so that when the engine is cold, the maximum lift phase of the intake valve is retarded so as to retard an intake valve opening timing to a point after an intake top dead center;
wherein the engine control unit controls the phase control mechanism so that retard of the maximum lift phase is set to be large when the lift and the operation angle are small;
wherein the engine control unit controls the phase control mechanism so that when the engine is cold, an intake valve closing timing is set at a point closer to an intake bottom dead center than a point at which the intake valve closing timing is set after the engine is warmed up, wherein the engine control unit controls the phase control mechanism so that at idling after the engine is warmed up, the intake valve closing timing is set at a point adjacent the intake bottom dead center.

19. An internal combustion engine comprising:
a compression ratio control mechanism capable of varying a compression ratio of the engine;
an ignition timing control system capable of varying an ignition timing of the engine; and
an engine control unit for controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load, wherein the engine control unit controls the ignition timing control system so that retard of the ignition timing is decreased gradually with increase of the engine load.

20. A method for controlling an internal combustion engine having a compression ratio control mechanism capable of varying a compression ratio of the engine, an ignition timing control system capable of varying an ignition timing of the engine, and a catalytic exhaust gas purifier disposed in an exhaust system of the engine, the method comprising:
controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load,
wherein the engine further includes a lift and operation angle control mechanism capable of varying a lift and operation angle of an intake valve of the engine simultaneously and continuously, and wherein the method further comprises controlling the lift and operation angle control mechanism so that the lift and the operation angle are varied continuously depending upon variations of the engine rpm and the engine load and that when the engine is cold, the lift and the operation angle are set to be small,
wherein the engine further includes a phase control mechanism capable of varying a maximum lift phase of an intake valve of the engine, and wherein the method further comprises controlling the phase control mechanism so that the maximum lift phase of the intake valve is retarded so as to retard an intake valve opening timing to a point after an intake top dead center,
wherein the method further comprises controlling the phase control mechanism so that retard of the maximum lift phase is set to be large when the lift and the operation angle are small; and
controlling the phase control mechanism so that at idling after the engine is warmed up, the intake valve closing timing is set at a point adjacent the intake bottom dead center.

21. A method according to claim 20, further comprising controlling the ignition timing control system so that when the engine is cold, the ignition timing is retarded to a point adjacent or after a compression top dead center.

22. A method according to claim 20, further comprising controlling the phase control mechanism so that when the engine is cold, an intake valve closing timing is set at a point closer to an intake bottom dead center than a point at which the intake valve closing timing is set after the engine is warmed up.

23. A method for controlling an internal combustion engine having a compression ratio control mechanism capable of varying a compression ratio of the engine, an ignition timing control system capable of varying an ignition timing of the engine, and a catalytic exhaust gas purifier disposed in an exhaust system of the engine, the method comprising:

controlling the compression ratio control mechanism and the ignition timing control system so that the compression ratio is varied depending upon variations of engine rpm, engine load and a warm-up condition of the engine and that when the engine is cold, the ignition timing is retarded largely from an MBT point and the compression ratio is set higher than that obtained when the engine is hot and operated at corresponding engine rpm and engine load; and controlling the ignition timing so that retard of the ignition timing is decreased gradually with increase of the engine load.

\* \* \* \* \*